United States Patent [19]
Hashimoto

[11] Patent Number: 5,425,906
[45] Date of Patent: Jun. 20, 1995

[54] SPEED CONTROL METHOD FOR INJECTION MOLDING MACHINE

[75] Inventor: Kiyoshi Hashimoto, Yamaguchi, Japan

[73] Assignee: UBE Industries, Inc., Yamaguchi, Japan

[21] Appl. No.: 309,050

[22] Filed: Sep. 20, 1994

[30] Foreign Application Priority Data

| | | | |
|---|---|---|---|
| Sep. 21, 1993 | [JP] | Japan | 5-234741 |
| Sep. 21, 1993 | [JP] | Japan | 5-234742 |
| Sep. 21, 1993 | [JP] | Japan | 5-234743 |
| Oct. 7, 1993 | [JP] | Japan | 5-251869 |
| Oct. 7, 1993 | [JP] | Japan | 5-251870 |

[51] Int. Cl.⁶ ............................................. B29C 45/77
[52] U.S. Cl. ............................. 264/40.1; 264/328.1; 425/145; 425/562
[58] Field of Search .............. 264/40.1, 40.5, 328.1; 425/135, 145, 146, 149, 562, 563, 587

[56] References Cited

FOREIGN PATENT DOCUMENTS

62-236721 10/1987 Japan.
2-141221 5/1990 Japan.

*Primary Examiner*—Jill L. Heitbrink
*Attorney, Agent, or Firm*—Samuels, Gauthier & Stevens

[57] ABSTRACT

An injection control method for an injection molding machine uses a step of filling a molten resin into a mold with an injection screw incorporated in a heating cylinder while changing an injection speed of the injection screw at a plurality of positions, and a dwell pressure application step of applying a pressure into the mold after filling. A predetermined filling pressure for determining a closing degree of a check valve is preset. The filling step includes comparing stroke information concerning an actual position of the injection screw with information concerning a reference position of the injection screw when one of pieces of information concerning a filling pressure, that changes in the filling step, reaches the predetermined filling pressure, and adjusting a subsequently performed change operation based on a difference between two pieces of information.

15 Claims, 10 Drawing Sheets

SPEED CONTROL METHOD FOR INJECTION MOLDING MACHINE

BACKGROUND OF THE INVENTION

The present invention relates to a speed control method for an injection molding machine.

Figure 9:
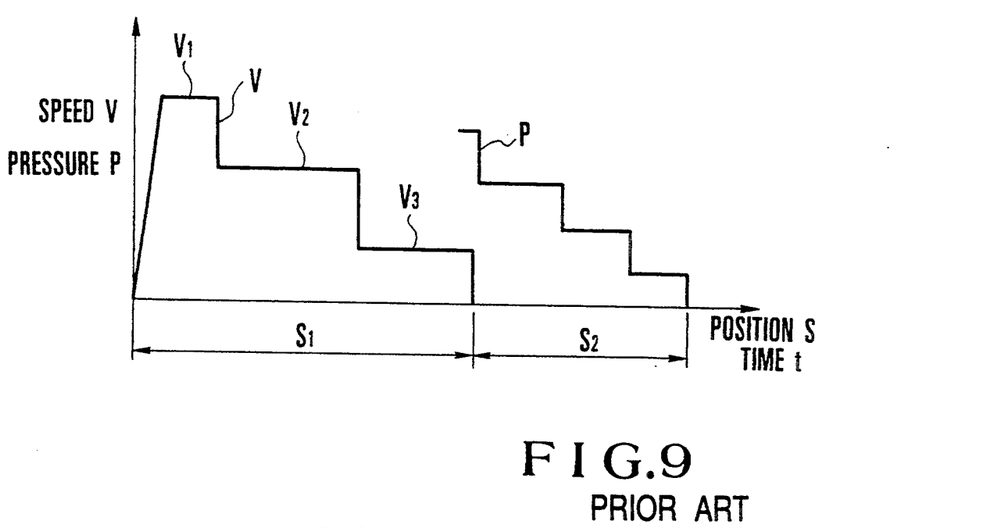
FIG. 9 is a graph showing an example of conventional injection control.

Conventionally, to injection-mold a molten resin by using an injection molding machine, the molten resin is filled into the cavity of a mold at a high speed. After the molten resin is filled, a pressure is applied to the resin in the cavity of the mold, thereby molding the resin. This injection control will be described more practically with reference to FIG. 9. Referring to FIG. 9, a position S of the injection screw and a time t are plotted along the axis of abscissa, and a forward speed V and a pressure P are plotted along the axis of ordinate.

Injection control is performed by a filling step S1 of filling a molten resin into a mold cavity at a high speed through several sub-steps, and a dwell pressure application step S2 of applying several stages of pressures to the resin in the mold cavity, after the molten resin is filled, thereby molding the resin. In most cases, in the filling step S1, the pressure regulating valve of a hydraulic circuit is set at a high pressure. The opening degree of a flow control valve is set to change in accordance with the lapse of time or in accordance with the stroke position of the injection screw, so that the speed is changed in a plurality of stages V1, V2, and V3 with reference to the lapse time since the start of injection or to the forward position of the injection screw. The injection speed of the piston of the injection cylinder, i.e., of the injection screw, is controlled by adjusting the flow control valve. The molten resin is filled into the cavity at a speed high enough not to trap air in the resin in the cavity. After the molten resin is filled in the cavity, the dwell pressure application step S2 is performed, wherein the flow control valve is fixed at a comparatively small opening degree and the hydraulic pressure is regulated by the pressure regulating valve. In the dwell pressure application step S2, the opening degree of the pressure regulating valve is changed so that a predetermined pressure can be applied to the molten resin, filled in the cavity, in accordance with the lapse of time. The dwell pressure application step S2 prevents shrinkage of the resin so that an error will not occur between the shape and size of the product and the shape and size of the cavity when the molten resin is cooled in the cavity, and prevents a large residual stress from being generated in the product.

Figure 10:
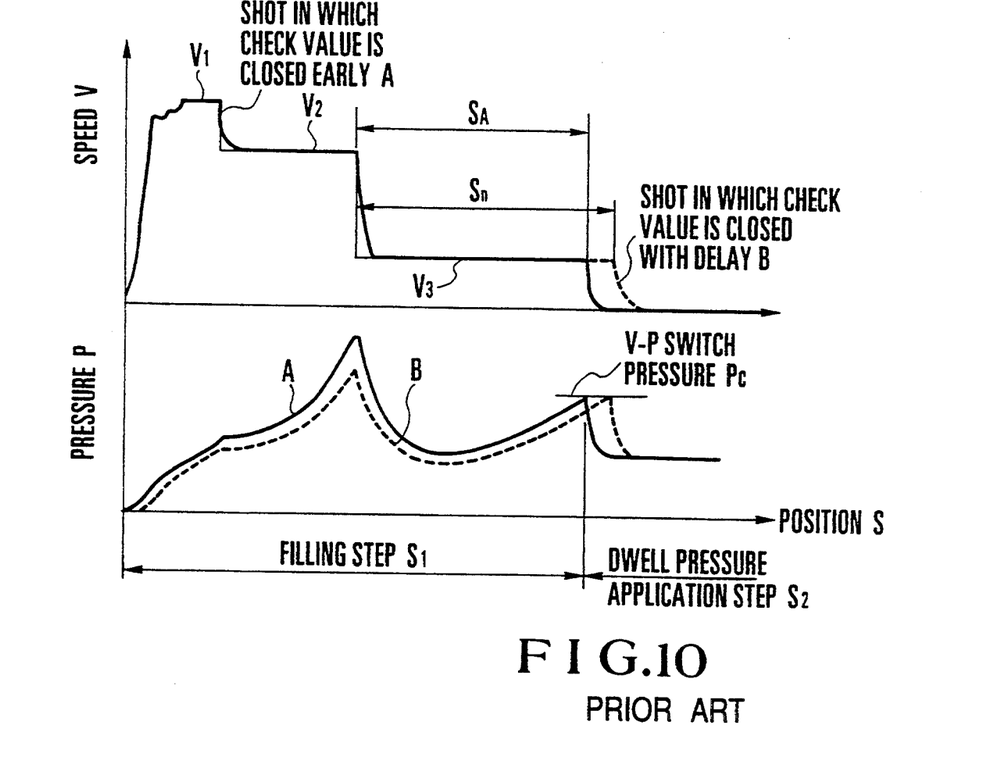
FIG. 10 is a graph showing conventional injection process control.

Generally, in injection process control of the filling step, the target control values of a plurality of stages of injection speeds are switched when the detection value of the injection screw coincides with a preset injection speed position, as described above. FIG. 10 shows an example of this switching operation. In FIG. 10, changes in injection speed V and in pressure P, obtained when switching control between three-stage preset speed values V1, V2, and V3 (V1>V2>V3) is performed in the filling step S1, is shown. In this manner, although changing or switching between a plurality of stages of injection speeds in the filling step is performed in accordance with the lapse of time very rarely, it is mostly performed as positional switching at every change/switching points, in which a switching operation is performed when the injection screw reaches a preset position.

A check valve for preventing a reverse flow of the molten resin in front of the injection screw toward the injection screw during injection does not operate at the same timing in each shot but operates at slightly different timings from one shot to another. Therefore, when the check valve is closed with a delay, the filling amount of the resin into the mold cavity, as compared to that obtained when the check valve is closed early, at the same screw position is decreased by an amount corresponding to an increase in reverse flow.

At a V - P switching point where a shift occurs from the filling step to the dwell pressure application step, a preset pressure switching operation is generally performed. Thus, in a shot in which the check valve is closed with a delay, the injection screw position (to be referred to as a V - P switching position hereinafter) where a V - P switching operation is performed becomes close to the forward limit of the screw. As a result, an area controlled by the preset speed of the final stage of the filling step is elongated. For example, in FIG. 10, a final-stage injection area $S_B$ of a shot B in which the check valve is closed with a delay becomes larger than a final-stage injection area $S_A$ of a shot A in which the check valve is closed early.

Figure 11:
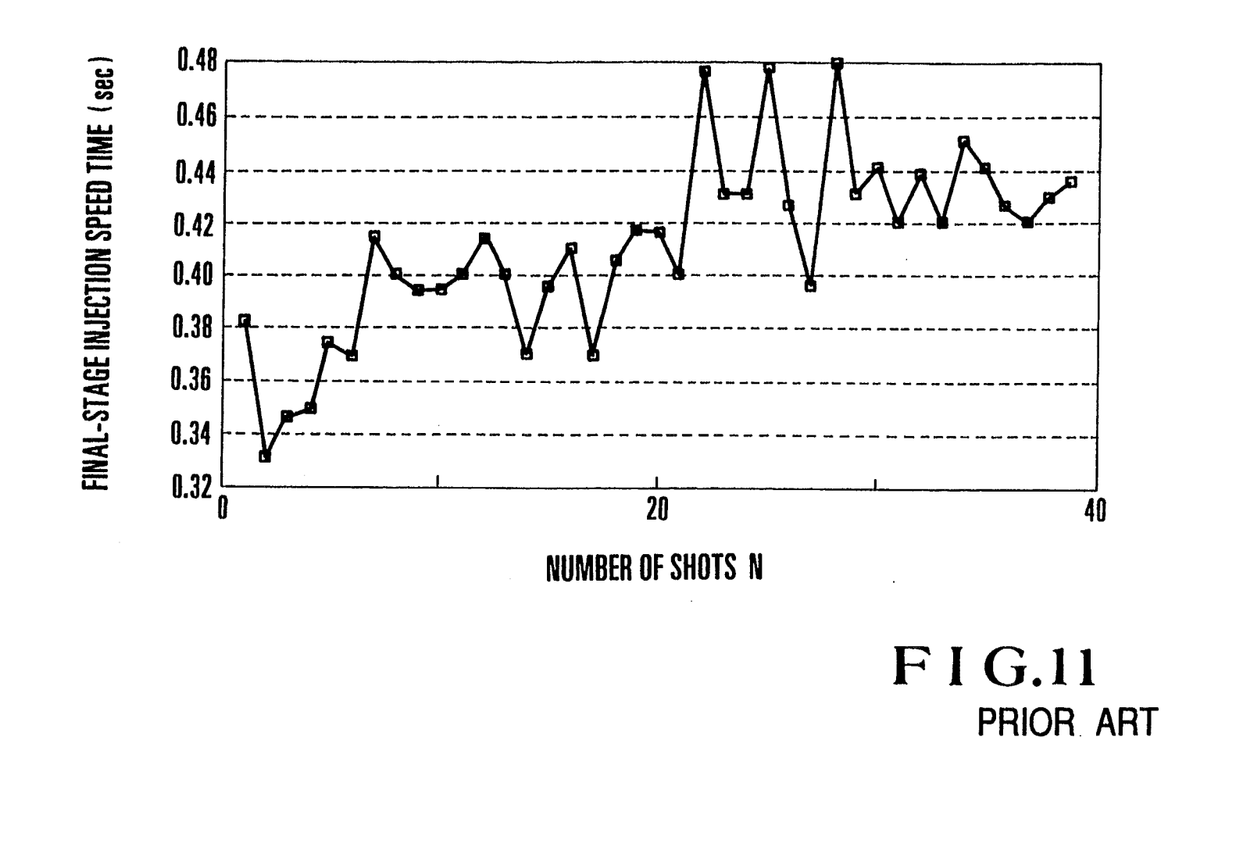
FIG. 11 is a graph showing final-stage injection time data in conventional injection process control.

Especially, when a resin material, e.g., nylon, which has a low melt viscosity with a high temperature dependency, is molded, the check valve closing characteristics vary from one shot to another more largely than with other resin materials. As a result, the V - P switching position also varies, and the width of variations of the area controlled by the preset speed of the final stage becomes large, thereby increasing the width of variations of the final-stage injection time. FIG. 11 shows a state wherein the final-stage injection speed time in the conventional position switching operation varies from one shot to another due to variations in closing characteristics of the check valve. In this manner, in a shot in which the check valve is closed with a delay, the injection time is prolonged, and the amount of resin cooled in the mold cavity is increased by an increase in injection time. Thus, the flow resistance in the mold cavity is increased, so that a filling amount into the cavity is short, causing a defective molded article having an insufficient volume.

As described above, conventionally, variations in check valve closing characteristics that differ from one shot to another cause non-uniformity in filling amount of the resin in the cavity, leading to generation of a sink mark on the surface of the molded article, generation of a shrinkage void in the molded article, variations in denseness, variations in weight of the molded articles, and variations in quality of the molded articles accompanying the variations in weight of the molded articles.

SUMMARY OF THE INVENTION

It is, therefore, the principal object of the present invention to provide a speed control method for an injection molding machine which can obtain molded articles having a stable quality even if the closing characteristics of the check valve vary from one shot to another.

It is another object of the present invention to provide a speed control method for an injection molding machine in which variations in weight and variations in quality of the molded articles caused by the variations in weight are improved more than with a conventional method even if the closing characteristics of the check valve vary from one shot to another.

In order to achieve these objects, according to the present invention, there is provided an injection control method for an injection molding machine which uses a step of filling a molten resin into a mold with an injection screw incorporated in a heating cylinder while changing an injection speed of the injection screw at a plurality of positions, and a dwell pressure application step of applying a pressure into the mold after filling, wherein a predetermined filling pressure for determining a closing degree of a check valve is preset, and the filling step comprises comparing stroke information concerning an actual position of the injection screw with information concerning a reference position of the injection screw when one of pieces of information concerning a filling pressure, that changes in the filling step, reaches the predetermined filling pressure, and adjusting a subsequently performed change operation based on a difference between two pieces of information.

DESCRIPTION OF THE PREFERRED EMBODIMENTS

The preferred embodiments of the present invention will be described in detail with reference to the accompanying drawings.

Figure 1:
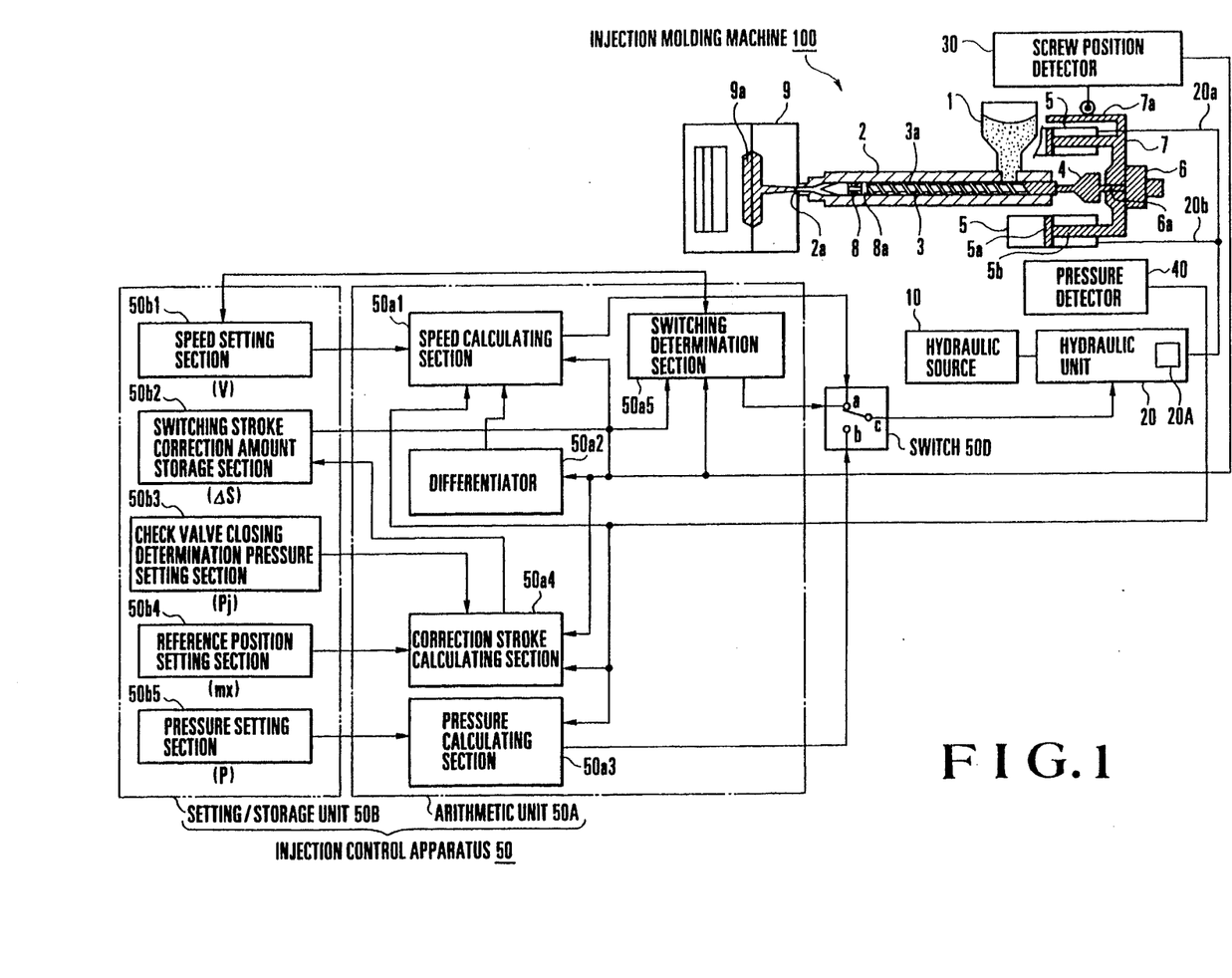
FIG. 1 is a diagram showing the arrangement of an injection control apparatus for an injection molding machine according to an embodiment of the present invention.
Figure 2:
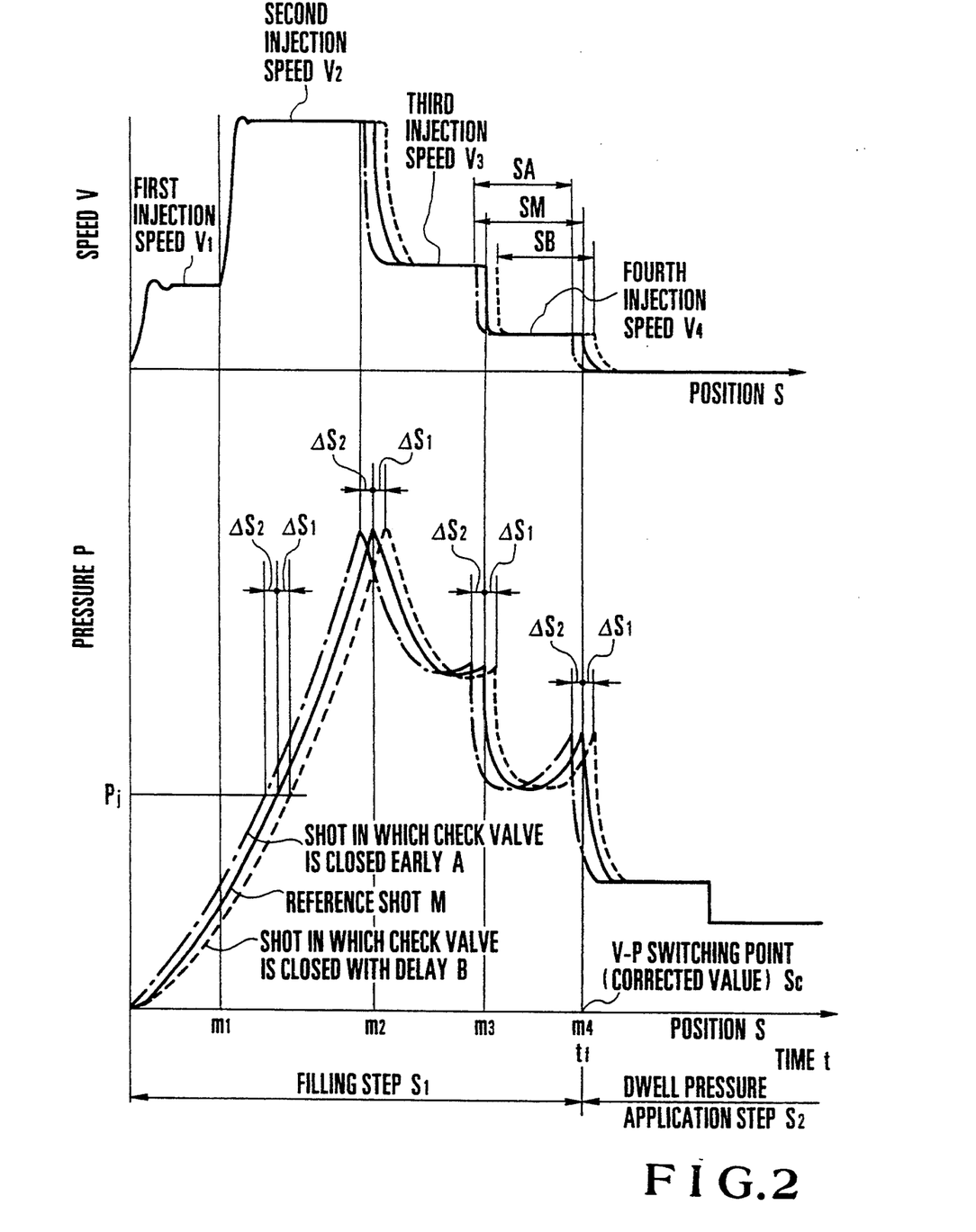
FIG. 2 is a graph showing injection process control according to the embodiment of the present invention.

FIG. 1 shows an injection control apparatus for an injection molding machine according to an embodiment of the present invention, and FIG. 2 shows a graph of injection process control.

Referring to FIG. 1, an injection molding machine 100 has a heating cylinder 2 provided with a hopper 1. An injection screw 3 is arranged in the heating cylinder 2 to be rotatable and movable back and forth. A connecting rod 4 is coupled to the rear end portion of the injection screw 3. The connecting rod 4 extends through a frame 7, and a drive shaft 6a of a hydraulic motor 6 fixed to the frame 7 is mounted to the distal end of the connecting rod 4. The connecting rod 4 and the injection screw 3 are driven by the hydraulic motor 6.

Piston rods 5b of a pair of injection cylinders 5, arranged above and below the heating cylinder 2 to sandwich it, are fixed to the frame 7. The number of injection cylinders 5 is increased as required. By the operation of pistons 5a of the injection cylinders 5, the piston rods 5b, the frame 7, the connecting rod 4, and the injection screw 3 can be integrally reciprocally moved in a direction substantially parallel to the injection cylinders 5. The position of the injection screw 3 is detected by measuring the movement of a lever 7a, coupled to the frame 7 and arranged in a direction substantially parallel to the injection screw 3, with a screw position detector 30.

The injection cylinders 5 are connected to a hydraulic source 10 and a hydraulic unit 20, connected to the hydraulic source 10, through pipes 20a and 20b. The hydraulic unit 20 incorporates a servo valve 20A for performing a flow rate control operation and a pressure control operation. The pressure of the hydraulic operating fluid of the injection cylinders 5 is detected by a pressure detector 40. A nozzle 2a at the distal end of the heating cylinder 2 is pressed against the nozzle port of a mold 9, thereby supplying a molten resin in the heating cylinder 2 to a cavity 9a.

An injection control apparatus 50, that receives positional information from the screw position detector 30 and pressure information of the injection cylinders 5 from the pressure detector 40, is constituted by an arithmetic unit 50A, a setting/storage unit 50B, and a switch 50D.

The arithmetic unit 50A has a speed calculating section 50a1, a differentiator 50a2, a pressure calculating section 50a3, a correction stroke calculating section 50a4, and a switching determination section 50a5. The pressure information of the injection cylinders 5 sent from the pressure detector 40 is supplied to the speed calculating section 50a1, the correction stroke calculating section 50a4, and the pressure calculating section 50a3. The positional information sent from the screw position detector 30 is supplied to the speed calculating section 50a1, the differentiator 50a2, the correction stroke calculating section 50a4, and the switching determination section 50a5.

The setting/storage unit 50B has a speed setting section 50b1, a switching stroke correction amount storage section 50a2, a pressure setting section 50b3 for setting a pressure for determining closing of the check valve, a reference position setting section 50b4, and a pressure setting section 50b5. A preset speed value (V) set by the speed setting section 50b1 is sent to the speed calculating section 50a1 and the switching determination section 50a5 described above. The speed setting section 50b1 also sets information concerning a speed switching position, and this information is also sent to the switching determination section 50a5. The switching stroke correction amount storage section 50b2 stores a switching stroke amount (ΔS) sent from the correction stroke calculating section 50a4 and sends this stored switching stroke amount ΔS to the switching determination section 50a5. The pressure setting section 50b3 sends a preset value Pj to the correction stroke calculating section 50a4. Reference position information mx of the reference position setting section 50b4 is sent to the correction stroke calculating section 50a4. Pressure information (P) of the pressure setting section 50b5 is sent to the pressure calculating section 50a3.

The switch 50D has a common movable terminal c and stationary terminals a and b. The common terminal c is connected to the stationary terminal a in the filling step, and to the stationary terminal b in the dwell pressure application step. The common terminal c is connected to the hydraulic unit 20. The stationary terminal a receives a signal from the switching determination section 50a5 and a signal from the speed calculating section 50a1. The stationary terminal b receives a signal from the pressure calculating section 50a3.

The basic operation of the injection control apparatus 50 will be described. First, the reference position mx where the determination pressure Pj of the optimum state is reached is obtained from experiments and experiences, and is input to the reference position setting section 50b4. Simultaneously, determination periods m1 to m2 (including mx) are set in the reference position setting section 50b4. The pressure setting section 50b3 sets the determination pressure Pj. Then, during injection of the filling step, the correction stroke calculating section 50a4 can know that the pressure P has reached Pj (two values coincide) from the pressure signal supplied from the pressure detector 40 and the signal from the pressure setting section 50b3. Since the correction stroke calculating section 50a4 obtains a signal from the screw position detector 30 and a signal (mx) from the reference position setting section 50b4, it can obtain an error with respect to the reference position based on these signal values, and calculates a switching stroke correction amount ($\Delta S$) from this error. The switching stroke correction amount ($\Delta S$) is sent to the switching stroke correction amount storage section 50b2 and stored therein.

The preset speed (V) from the speed setting section 50b1 and the information on the speed switching position are sent to the switching determination section 50a5. The switching determination section 50a5 also receives the switching stroke amount ($\Delta S$) from the switching stroke correction amount storage section 50b2 and calculates a speed switching position (mn$\pm\Delta S$). The switching determination section 50a5 then compares the obtained value with the signal from the screw position detector 30, and sends a hydraulic pressure control signal to the hydraulic unit 20 through the switch 50D based on the comparison result.

Speed detection is performed by differentiating the signal from the screw position detector 30 by the differentiator 50a2. The actual speed signal obtained by this calculation is compared with the preset speed, i.e., an instructed speed signal, sent from the speed setting section 50b1 by the speed calculating section 50a1. If these two signals are different, the difference is sent as a feedback signal to the hydraulic unit 20 through the switch 50D in order to control the servo valve 20A, thereby controlling the moving speed of the injection cylinders 5 to a desired value.

To obtain a speed switching position signal, a signal from the speed setting section 50b1 and the signal from the screw position detector 30 are compared by the speed calculating section 50a1, and the comparison result is sent to the hydraulic unit 20 through the switch 50D as the speed switching position signal.

Note that in the switch 50D, the common terminal c is connected to the stationary terminal a throughout the entire filling step.

In the dwell pressure application step, the common terminal c of the switch 50D is connected to the stationary terminal b, so that a dwelling pressure (P) from the pressure setting section 50b5 and a signal concerning instruction of the dwell pressure switching time are supplied to the pressure calculating section 50a3, and that a control signal obtained by comparing the dwell pressure with a signal from the pressure detector 40 is sent to the hydraulic unit 20 through the switch 50D, thereby controlling the servo valve 20A.

The operation of the injection molding machine 100 will be described first. When the injection screw 3 is rotated by the hydraulic motor 6, a resin material is supplied from the hopper 1 into the heating cylinder 2. The resin material is heated to be melt while it passes through a helical screw groove space 3a defined by the heating cylinder 2 and the injection screw 3, and is stored in front of the injection screw 3. At the same time, the injection screw 3 is gradually moved backward. When the injection screw 3 reaches a predetermined position, the hydraulic motor 6 is stopped, thereby completing a metering step.

Subsequently, the servo valve 20A provided in the vicinity of the injection cylinders 5 is controlled to send a hydraulic operating fluid to the injection cylinders 5 through the pipes 20a and 20b, so that the injection screw 3 is moved forward, thereby injecting the molten resin into the cavity 9a of the mold 9.

In the initial stage of the injection process, when the injection screw 3 is moved forward, part of the molten resin in front of the injection screw 3 flows backward through the screw groove 3a. Thereafter, however, a check valve 8 is seated on a check seat 8a to prevent a reverse flow. The operation of the check valve 8 to seat on the check seat 8a depends on the forward movement of the screw 3 and the difference in pressure between the front and rear portions of the check seat 8a caused by the reverse flow of the molten resin in front of the injection screw 3 which accompanies the forward movement of the injection screw 3. The timing of the seating operation varies from one shot to another.

In the injection process (filling step), the injection speed of the injection screw 3 is controlled. In the dwell pressure application process (dwell pressure application step), one (the injection cylinder pressure is employed in the embodiment of FIG. 1) of the hydraulic pressure of the injection cylinders 5, the pressure (e.g., the pressure in front of or behind the check valve 8) of the resin in the heating cylinder 2, and the pressure in the mold is controlled.

In one embodiment of the present invention, as shown in FIG. 2, an injection speed change/switching operation of each of the plurality of stages of injection speeds (in the embodiment shown in FIG. 2, four stages of injection speeds including a first-stage preset speed value V1, a second-stage preset speed value V2, a third-stage preset speed value V3, and a fourth-stage preset speed value V4) in the filling step is performed in accordance with the following procedure.

First, in the same manner as in the conventional speed control method, in the change/switching operation of the plurality of stages of injection speeds, a so-called position switching operation is performed, wherein a speed switching operation is executed when the actual injection screw 3 reaches a preset position of the injection screw 3 in an estimated reference shot (a shot indicating a switching operation procedure which is assumed to be the most normal injection state). However, as shown in FIG. 2, the closing operation is delayed from an estimation curve M of a reference shot obtained from a predetermined standard shots dye to variations in closing operation of the check valve 8 immediately after the start of filling. Thus, the closing operation is slightly deviated from one shot to another, as indicated by curves A and B. For this reason, a position switching operation is not performed at reference change/switching positions m1, m2, m3, and m4 preset with the reference shot. Instead, Pj (between the reference change/switching positions m1 and m2 in the embodiment of FIG. 2) is preset. A check valve closing determination pressure Pj is preset at an arbitrary point in the filling step. A difference between the position of the injection screw 3 which is measured when the injection pressure P reaches the determination pressure Pj and the position of the injection screw 3 which is obtained when the estimation curve M of the reference shot reaches the determination pressure Pj is calculated by the correction stroke calculating section 50a4, and is stored in the switching stroke correction amount storage section 50b2. The respective reference change/switching positions mx, mx+1, mx+2 , . . . (x indicates an arbitrary position of a change/switching operation) after the check valve closing determination pressure Pj is reached are corrected by the switching determination section 50a5 by this difference. The switching determination section 50a5 executes a speed switching operation at the respective corrected switching positions.

When the speed switching operation is performed in accordance with the above operation, for example, in the shot B in which the check valve 8 is closed with a delay, the closing timings are sequentially delayed from the reference shot estimation curve M by a difference $\Delta S1$ obtained when the determination pressure is reached. Even at a V - P switching point SC, a V - P switching operation is executed at a position delayed from the reference change/switching position m1 by the difference $\Delta S1$. Thus, a final-stage injection speed area SB becomes substantially equal to a final-stage injection speed area SM of the reference shot. Inversely, in a shot A in which the check valve 8 is closed early, a V - P switching operation starts earlier by a time corresponding to a difference $\Delta S2$, and a final-stage injection speed area SA also becomes substantially equal to SM.

As described above, since the final-stage preset speeds are equal, if the final-stage injection speed areas SM, SA, and SB are substantially equal, final-stage injection times tf are not influenced by variations in closing characteristics of the check valve 8 but are substantially equal.

When a speed switching operation is executed in the above manner, even in the shot B in which the check valve 8 is closed with a delay in the initial stage of the filling step or the shot A in which the check valve 8 is closed early, the final-stage injection speed areas and the final-stage injection times are maintained almost at constant values, in the same manner as in the reference shot M. As a result, the amount of resin filled in the mold cavity 9a is maintained at a predetermined value in each shot, thereby stabilizing the quality of the molded articles.

The intention of the present invention is as follows. Even if the check valve 8, which operates at an initial stage of the filling step, is closed with a delay, or inversely is closed early, at a reference speed switching position mx after the closing determination pressure Pj of the check valve 8 is preset, a difference between the position of the injection screw 3 obtained when the check valve closing determination pressure Pj, provided midway along the process, is reached, and the position of the injection screw 3 in the reference shot is calculated and stored. The subsequent reference change/switching positions mx, mx+1, mx+2, . . . , are corrected using this difference, and a position switching operation is performed. Therefore, even if the injection time of the first injection speed in one shot differs from that in another shot, the injection time, especially the final-stage injection time, following the first injection is set to be substantially the same, so that the cavity filling amount is maintained at a constant value. As a result, a difference in check valve closing timings which differ between the shots will not be reflected in the final-stage injection time.

More specifically, whether the closing operation of the check valve at the initial stage of the first-speed injection is early or delayed is determined from the position of the injection screw 3 when the determination pressure Pj is reached. If the injection screw 3 is located on the backward side of the injection molding machine when the injection pressure reaches the determination pressure Pj, this is a shot in which the check valve is closed early. If the injection screw 3 is located on the forward side, this is a shot in which the check valve is closed with a delay. Subsequent reference change/switching positions are corrected by the difference in the position of the check valve 8, thereby setting other injection times, especially the final-stage injection time, to be the same. Various types of tests were performed. From the results of these tests, it is obvious that variations in final-stage injection time from one shot to another, which are shown in FIG. 11 and caused by employing the conventional method of performing all the speed switching operations as position switching operations, can be largely decreased by executing the method of the present invention. The width of variations was decreased to about 20% excluding the initial stage of the operation.

When a resin material, e.g., nylon, whose molten viscosity has a high temperature dependency, is employed, according to the conventional control method, the final-stage injection time varies due to the variations in closing characteristics of the check valve. As a result, even when control is shifted to pressure control at the same V - P switching pressure Pc to start the dwell pressure application step, if the shot has a long final-stage injection time, the temperature of the molten resin in the mold is decreased to increase its viscosity, thus increasing the flow resistance. Thus, filling of the resin material cannot be performed smoothly, and the entire filling amount of the mold during the V - P switching operation cannot be maintained at a constant value, leading to an unstable quality of the molded articles. The method according to the present invention solves these problems. According to the present invention, even a reference change/switching position m1 serving as the V - P switching point is delayed by a difference $\Delta S1$ or is forwarded by a difference $\Delta S2$ so that the final-stage injection time is substantially constant, as has been described above, thereby stabilizing the quality of the molded articles.

In the embodiment of the present invention shown in FIG. 2, the reference speed switching position m4 serving as the V - P switching point SC is also set at a switching position corrected with the difference mentioned above. However, at the V - P switching point SC, a pressure switching operation by means of a V - P switching pressure preset value PC can also be performed, as in the prior art technique (shown in FIG. 10) (However, since the V - P switching pressure PC must be separately set in addition to the determination pressure Pj, control becomes complicated and cumbersome, which is not desirable).

As described above, according to this embodiment, the non-uniformities in the final-stage injection speed area and the time varying from one shot to another, which variations are seen in conventional injection process control wherein all the injection speed switching operations are performed as preset position switching operations, are eliminated as much as possible. Even if the closing characteristics of the check valve vary, variations in weight of the molded articles from one shot to another and variations in quality of the molded articles which are caused by the variations in weight of the molded articles can be prevented. As a result, the quality of the molded articles is stabilized, and an operation with high reliability can be continued, thereby improving the productivity.

Figure 3:
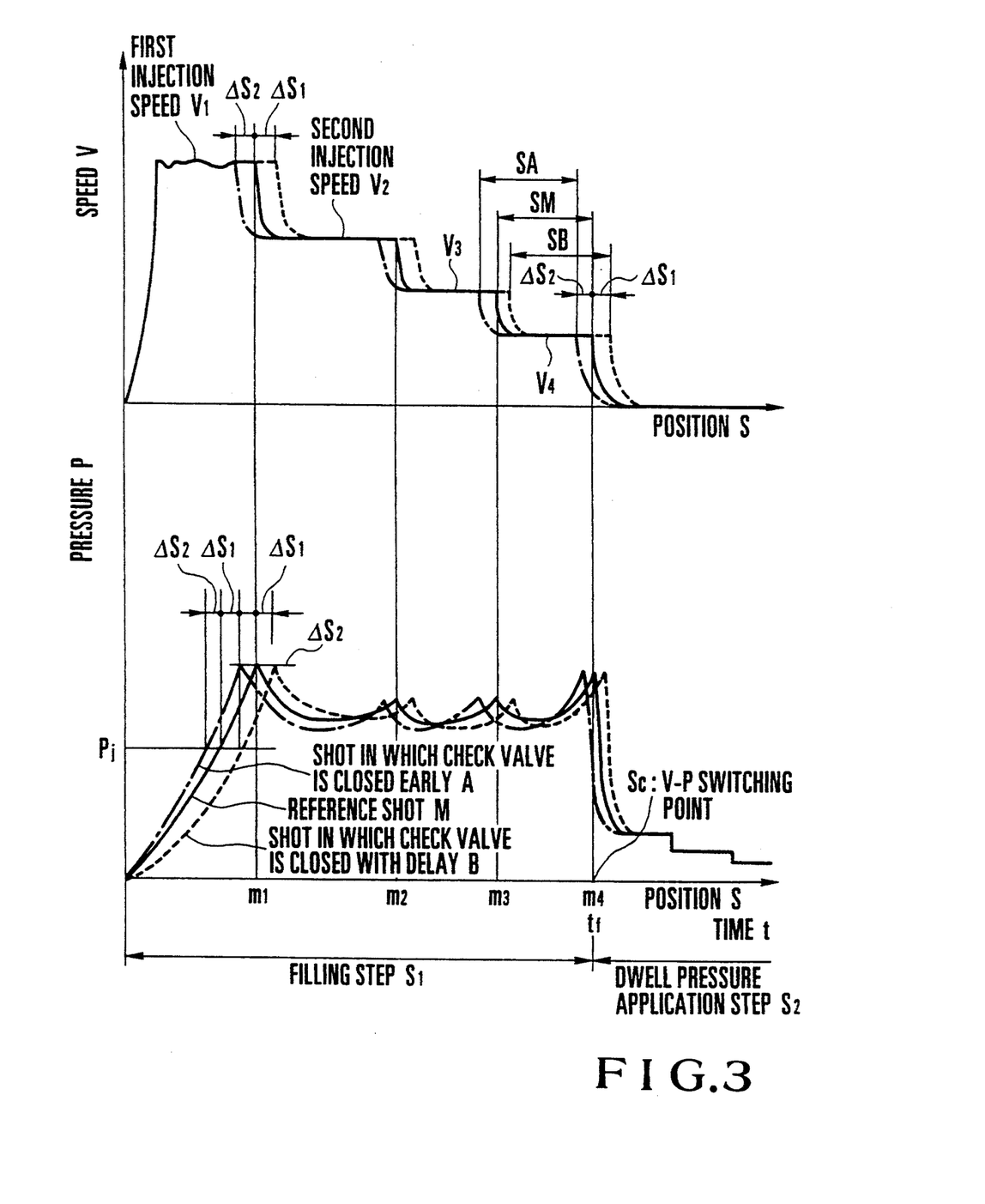
FIG. 3 is a graph of injection process control that indicates another embodiment of the present invention.

FIG. 3 shows another embodiment of the present invention. In this embodiment, especially, a check valve closing determination pressure which is lower than the injection pressure employed for a speed switching operation from the first to the second injection speed in the filling step is set in advance. A difference between an injection screw position obtained at the start of filling and an injection screw position obtained when the injection pressure reaches the determination pressure after filing is started is calculated and stored. To perform a plurality of stages of injection switching operations, the respective preset injection switching positions are corrected by adding or subtracting the above difference to obtain corrected injection screw positions, and a speed switching operation is performed at the corrected injection screw positions.

In this embodiment, as shown in FIG. 3, the injection speed change/switching operation of each of the plurality of stages of injection speeds (in the embodiment shown in FIG. 3, four stages of injection speeds including a first-stage preset speed value V1, a second-stage preset speed value V2, a third-stage preset speed value V3, and a fourth-stage preset speed value V4) in the filling step is performed in accordance with the following procedure.

First, in the same manner as in the conventional speed control method, in the change/switching operation of the plurality of stages of injection speeds, a so-called position switching operation is performed, wherein a speed switching operation is executed when the actual injection screw 3 reaches a preset position of the injection screw 3 in an estimated reference shot (a shot indicating a switching operation procedure which is assumed to be the most normal injection state). However, as shown in FIG. 3, the closing operation is delayed from an estimation curve M of a reference shot obtained from predetermined standard shots due to variations in closing operation of the check valve 8 immediately after the start of filling. Thus, the closing operation is slightly deviated from one shot to another, as indicated by curves A and B. For this reason, a position switching operation is not performed at reference change/switching positions m1, m2, m3, and m4 preset with the reference shot. Instead, a pressure P which is lower than the injection pressure at the switching position m1 located midway from the first injection speed V1 to the second injection speed V2 is set at a check valve closing determination pressure Pj. A difference between the position of the injection screw 3, which is measured when the injection pressure P reaches the determination pressure Pj after the start of filling and before reaching the switching position m1, and the position of the injection screw 3, which is obtained when the estimation curve M of the reference shot reaches the determination pressure Pj, is calculated by the correction stroke calculating section 50a4, and is stored in the switching stroke correction amount storage section 50b2. The respective reference change/switching positions m1 to m4 are corrected by the switching determination section 50a5 with this difference. The switching determination section 50a5 executes a speed switching operation at the respective corrected switching positions.

When the speed switching operation is performed in accordance with the above operation, for example, in the shot B in which the check valve 8 is closed with a delay, the closing timings are sequentially delayed from the reference shot estimation curve M by a difference $\Delta S1$ obtained when the determination pressure is reached. Even at a V - P switching point SC, a V - P switching operation is executed at a position delayed from the reference change/switching position m4 by the difference $\Delta S1$. Thus, a final-stage injection speed area SB becomes substantially equal to a final-stage injection speed area SM of the reference shot. Inversely, in a shot A in which the check valve 8 is closed early, a V - P switching operation starts earlier by a time corresponding to a difference $\Delta S2$, and a final-stage injection speed area SA also becomes substantially equal to SM.

As described above, since the final-stage preset speeds are equal, if the final-stage injection speed areas SM, SA, and SB are substantially equal, final-stage injection times tf are not influenced by variations in closing characteristics of the check valve 8 but are substantially equal.

When a speed switching operation is executed in the above manner, even in the shot B in which the check valve 8 is closed with a delay in the initial stage of the filling step or the shot A in which the check valve 8 is closed early, the final-stage injection speed areas and the final-stage injection times are maintained almost at constant values, in the same manner as in the reference shot M. As a result, the amount of resin filled in the mold cavity 9a is maintained at a predetermined value in each shot, thereby stabilizing the quality of the molded articles.

This embodiment has the following purpose. Even if the check valve 8, which operates at an initial stage of the filling step, is closed with a delay, or inversely is closed early, before the reference speed switching position m1 is reached, a difference between the position of the injection screw 3 obtained when the check valve closing determination pressure Pj, provided midway along the process, is reached, and the position of the injection screw 3 in the reference shot is calculated and stored. The subsequent reference change/switching positions m2, m3, and m4 are corrected by this difference, and a position switching operation is performed. Therefore, even if the injection time of the first injection speed is one shot differs from that in another shot, the injection time, especially the final-stage injection time, following the first injection is set to be substantially the same, so that the cavity filling amount is maintained at a constant value. As a result, a difference in check valve closing timings which differ between the shots will not be reflected in the final-stage injection time.

Figure 5:
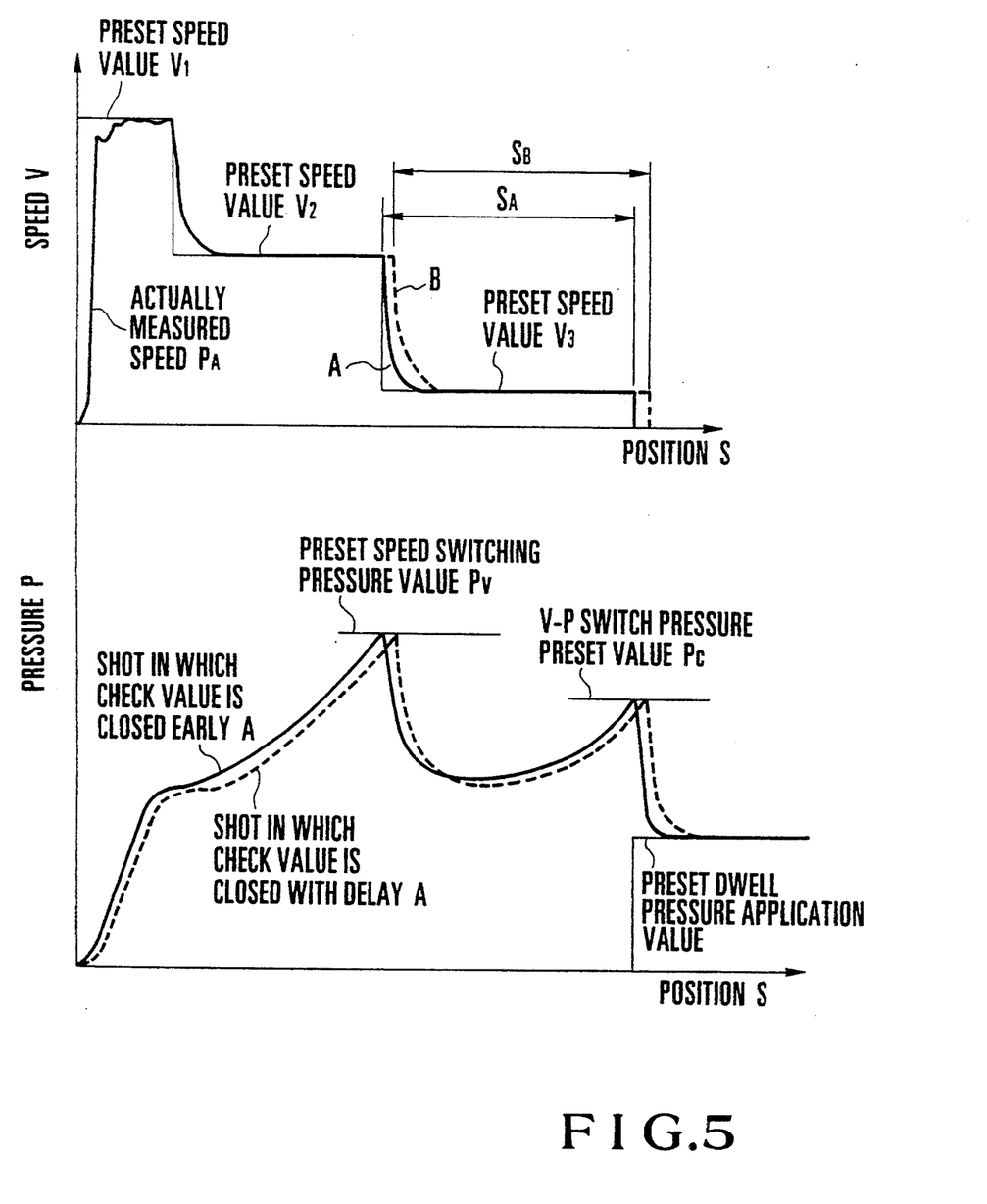
FIG. 5 is a graph of injection process control that indicates still another embodiment of the present invention.

More specifically, whether the closing operation of the check valve at the initial stage of the first-speed injection is early or delayed is determined from the position of the injection screw 3 when the determination pressure which is provided to the first injection speed after the start of filling is reached. If the injection screw 3 is located on the backward side of the injection molding machine when the injection pressure reaches the determination pressure Pj, this is a shot in which the check valve is closed early. If the injection screw 3 is located on the forward side, this is a shot in which the check valve is closed with a delay. Subsequent reference change/switching positions are corrected by the difference in the position of the check valve 8, thereby setting other injection times, especially the final-stage injection time, to be the same. Various types of tests were performed. From the results of these tests, it is obvious that variations in final-stage injection time from one shot to another, which are shown in FIG. 5 wherein all the speed switching operations are performed as position switching operations can be largely decreased by executing the method of the present invention. The width of variations was decreased to about 20% excluding the initial stage of the operation.

Figure 4:
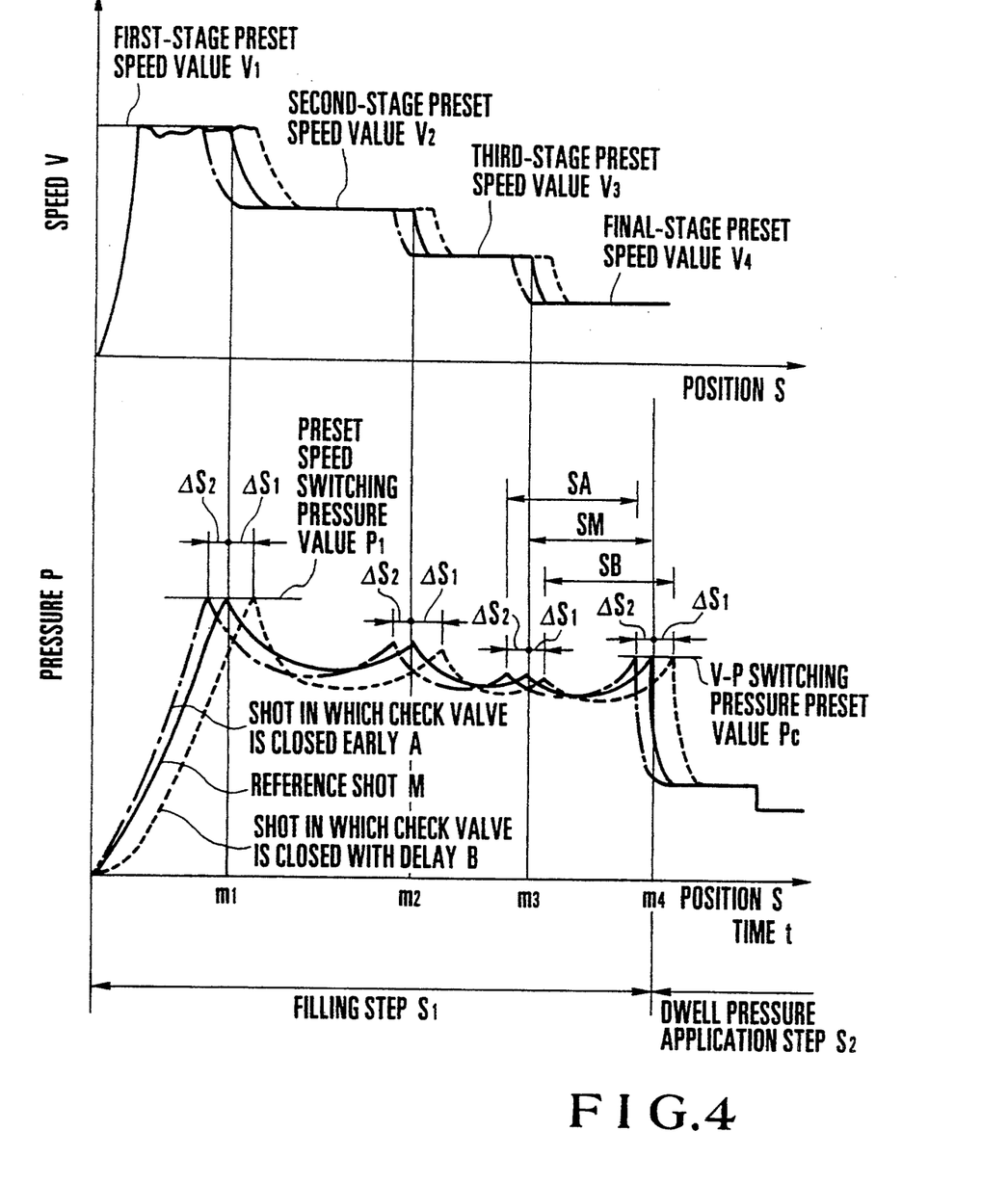
FIG. 4 is a graph of injection process control that indicates still another embodiment of the present invention.

FIG. 4 shows another embodiment of the present invention. In this embodiment, a speed switching operation from the first to the second injection speed is performed especially when the injection pressure during injection filling reaches a preset injection speed switching pressure. A difference between an injection screw position obtained at the speed switching operation and a switching position of the injection speed from the first to the second injection speed in a shot designated as the reference shot is calculated and stored. To perform a speed switching operation from the second to the third injection speed and to perform subsequent injection speed switching operations, the respective reference change/switching positions are corrected by adding or subtracting the difference in injection screw position obtained during the speed switching operation from the first to the second injection speed to obtain corrected injection screw positions, and a speed switching operation is performed at the corrected injection screw positions.

In this embodiment, as shown in FIG. 4, the injection speed change/switching operation of each of the plurality of stages of injection speeds (in the embodiment shown in FIG. 4, four stages of injection speeds including a first-stage preset speed value V1, a second-stage preset speed value V2, a third-stage preset speed value V3, and a fourth-stage preset speed value V4) in the filling step is performed in accordance with the following procedure.

More specifically, when a speed switching operation from the first-stage preset speed value V1 (also referred to as the first injection speed) to the second-stage preset speed value V2 is to be performed, not a position switching operation at the preset reference switching position m1 but so-called a pressure switching operation is performed wherein a switching operation is performed when the injection pressure P during filling reaches the preset speed switching pressure value P1. An injection pressure in this case employs either an injection cylinder pressure measured by the pressure detector, a resin pressure in the vicinity of the distal end of the nozzle of the heating cylinder, or a pressure in the mold. In the apparatus of FIG. 1 to which this embodiment is applied, the injection cylinder operational pressure is employed. Each of the plurality of stages of reference change/switching positions m1, m2, m3, and m4 indicates a switching position in a reference shot which is selected arbitrarily (specified by the operator when molding is stabilized after the start of molding), which reference shot is shown as a reference shot M in FIG. 4 (indicated by a solid line).

As described above, due to the variations in the closing characteristics of the check valve of the injection molding machine, a shot A in which the check valve is closed early or a shot B in which the check valve is closed with a delay is usually deviated from the reference shot M. Therefore, when a pressure switching operation with the speed switching pressure preset value P1 is executed during a switching operation from the first to the second injection speed, the shot B is delayed from the shot M by the positional difference ΔS1, and inversely, in the shot A, a speed switching operation is performed earlier than in the shot M by the positional difference ΔS2. These positional differences ΔS1 and ΔS2 are calculated and stored. In a switching operation from the second to the third injection speed and in subsequent switching operations, a speed switching operation is executed as a position switching operation at a corrected position (in the case of the shot A, a position that comes earlier by the positional difference ΔS2) obtained by adding the positional difference ΔS1 to each reference change/switching positions m2 or m3.

When a speed switching operation is executed in the above manner, even in the shot B in which the check valve 8 is closed with a delay in the initial stage of the filling step or the shot A in which the check valve 8 is closed early, the final-stage injection speed areas and the final-stage injection times are maintained almost at constant values, in the same manner as in the reference shot M. As a result, the amount of resin filled in the mold cavity 9a is maintained at a predetermined value in every shot, thereby stabilizing the quality of the molded articles (in the embodiment of FIG. 4, the final-stage injection area SA of the shot A and the final-stage injection area SB of the shot B are both substantially equal to the final-stage injection area SM of the shot M (reference shot), and the final-stage injection times are also substantially equal).

This embodiment has the following purpose. Even if the check valve 8, which operates at an initial stage of the filling step, is closed with a delay, or inversely is closed early, the injection filling time of the first injection speed is set as a time period before the injection pressure detected at the end of the first injection speed of the reference shot is reached. A difference between the actual position of the injection screw 3 obtained when this speed switching operation is executed and the reference change/switching position m1 in the reference shot is calculated by the correction stroke calculating section 50a4, and the calculation result is stored in the switching stroke correction amount storage section 50b2. The subsequent reference change/switching positions m2, m3, and m4, are corrected by this difference, and a position switching operation is performed. Therefore, even if the injection time of the first injection speed in one shot differs from that in another shot, the injection time, especially the final-stage injection time, following the first injection is set to be substantially the same, so that the cavity filling amount is maintained at a constant value. As a result, a difference in check valve closing timings which differ between the shots will not be reflected in the final-stage injection time.

More specifically, a change/switching operation from the first to the second injection speed is performed not as a position switching operation but as a pressure switching operation employing an injection pressure during filling which is reached in the reference shot. Whether the closing operation of the check valve at an initial stage of the first-speed injection is early or delayed is determined from the magnitude of a difference between the position of the injection screw at this change/switching point and the reference change/switching position m1 in the reference shot. Subsequent reference change/switching positions are corrected by these differences, thereby setting other injection times, especially the final-stage injection time, to be the same.

Various types of tests were performed. From the results of these tests, it is obvious that variations in final-stage injection time from one shot to another, which are shown in FIG. 11 and caused by employing the conventional method wherein all the speed switching operations are performed as position switching operations can be largely decreased by executing the method of this embodiment. The width of variations was decreased to about 20% excluding the initial stage of the operation.

FIG. 5 shows still another embodiment. In this embodiment, of the change/switching points of the plurality of stages of injection speeds, at least at the final-stage switching point, an injection speed switching operation of the injection speed is performed when the injection cylinder pressure measured by the pressure detector, the resin pressure, or the mold pressure reaches a preset value.

More specifically, as shown in FIG. 5, of the plurality of stages of injection speeds (in the embodiment of FIG. 5, the three stages including preset speed values V1, V2, and V3) of the filling step, at least a switching operation from the injection speed V2 to the injection speed V3 of a stage preceding the final stage is performed not as a position switching operation but as a pressure switching operation. When a pressure P measured by the pressure detector 40 reaches a preset speed switching pressure value PV, an injection speed V is switched from the preset speed value V2 to V3. In this case, when the pressure curve of a shot B in which the check valve 8 is closed with a delay is compared with the pressure curve of a shot A in which the check valve 8 is closed early, the former indicates a pressure lower than that in the shot A at the same position S, as shown in FIG. 5, due to a delay in rise at the initial stage of the filling step. The position of the pressure curve of the shot B where the preset speed switching pressure value Pv is reached at the final-stage injection speed switching point is deviated to the forward side (to the right in FIG. 5) from that of the shot A. The pressure curve of the shot B exhibits the similar behavior also at the V - P switching point, and the value of deviation is also almost the same. In fine, it was confirmed from molding experiments and tests employing the actual apparatus that the final-stage injection distance SA of the shot A was almost equal to the final-stage injection distance SB of the shot B.

More specifically, when the check valve 8 is closed with a delay, the V - P switching position moves close to the forward side of the screw, as described above. However, the pressure during filling at a screw position before this is relatively lower than in a shot in which the check valve is closed early. It is thus obvious that the pressure during filling can be utilized as a means for determining the closing degree of the check valve 8 in a given shot before the V - P switching position is reached. Thus, as a control method for minimizing the adverse influence of the variations in closing characteristics of the check valve, injection process control is performed wherein a switching operation is performed to a next-stage injection speed preset value when the pressure during filling reaches a preset value. As a result, the non-uniformities in the final-stage speed area and the time varying from one shot to another, which variations are seen in conventional injection process wherein all the injection speed switching operations are performed as position switching operations, are eliminated as much as possible. Thus, variations in weight of the molded articles and variations in quality of the molded articles which are caused by the variations in weight of the molded articles can be prevented.

Figure 6:
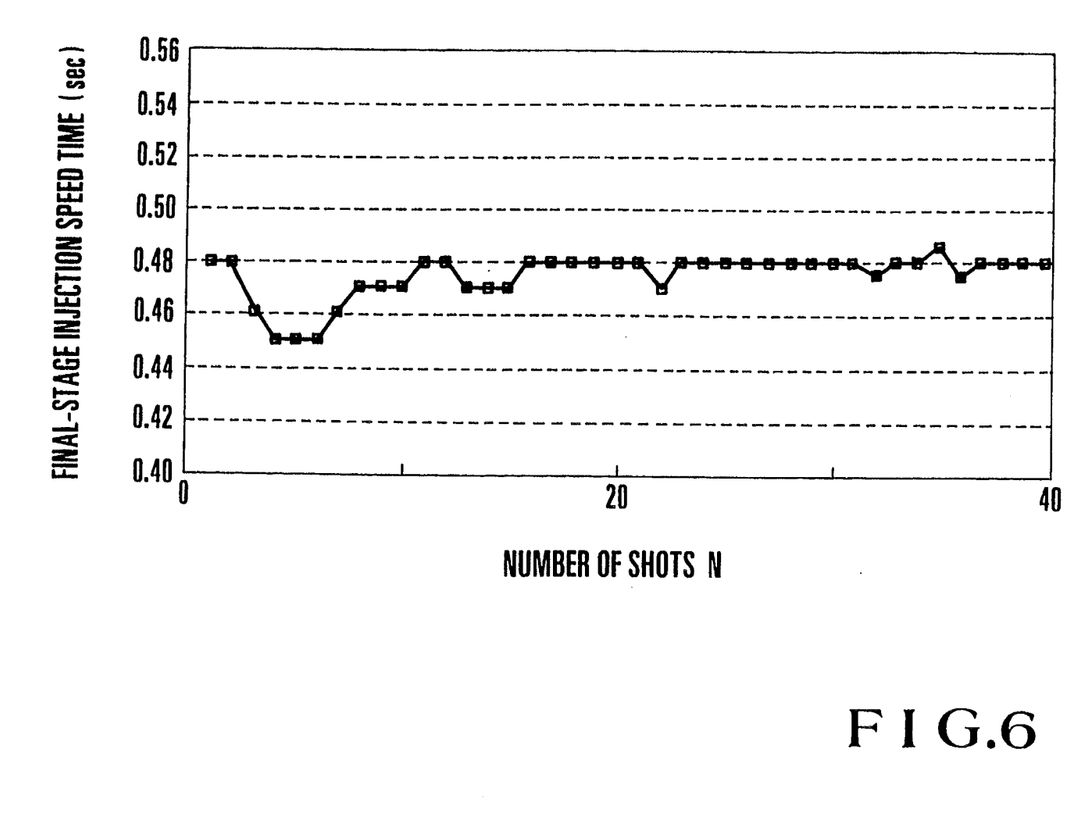
FIG. 6 is a graph showing final-stage injection time data obtained by the embodiment of the present invention shown in FIG. 5.

According to the embodiment of FIG. 5, the final-stage injection time is stabilized even in molding of a low-viscosity resin with which the closing characteristics of the check valve tend to vary. Thus, stabilization of the molded products, which cannot be achieved by the conventional control method, can be achieved. FIG. 6 is a graph in which the final-stage injection times of the respective shots are connected. When FIG. 6 is compared with FIG. 11 showing the measurement result of the conventional method, it is obvious that the final-stage injection time is stabilized. Especially, when a resin material, e.g., nylon, whose molten viscosity has a high temperature dependency, is employed, according to the conventional control method, the final-stage injection time varies due to the variations in closing characteristics of the check valve. As a result, even when control is shifted to pressure control at the same V - P switching pressure to start the dwell pressure application step, the entire filling amount of the mold during the V - P switching operation cannot be maintained at a constant value. This is because when the check valve is closed with a delay, the time in which control is performed with the final-stage injection preset speed is prolonged, and the temperature of the molten resin in the mold is decreased, thereby increasing its viscosity. In this embodiment, both the start and end points of the final-stage injection preset speed are not influenced by the preset pressure, but are constantly maintained at substantially predetermined times, as has been described above.

Figure 7:
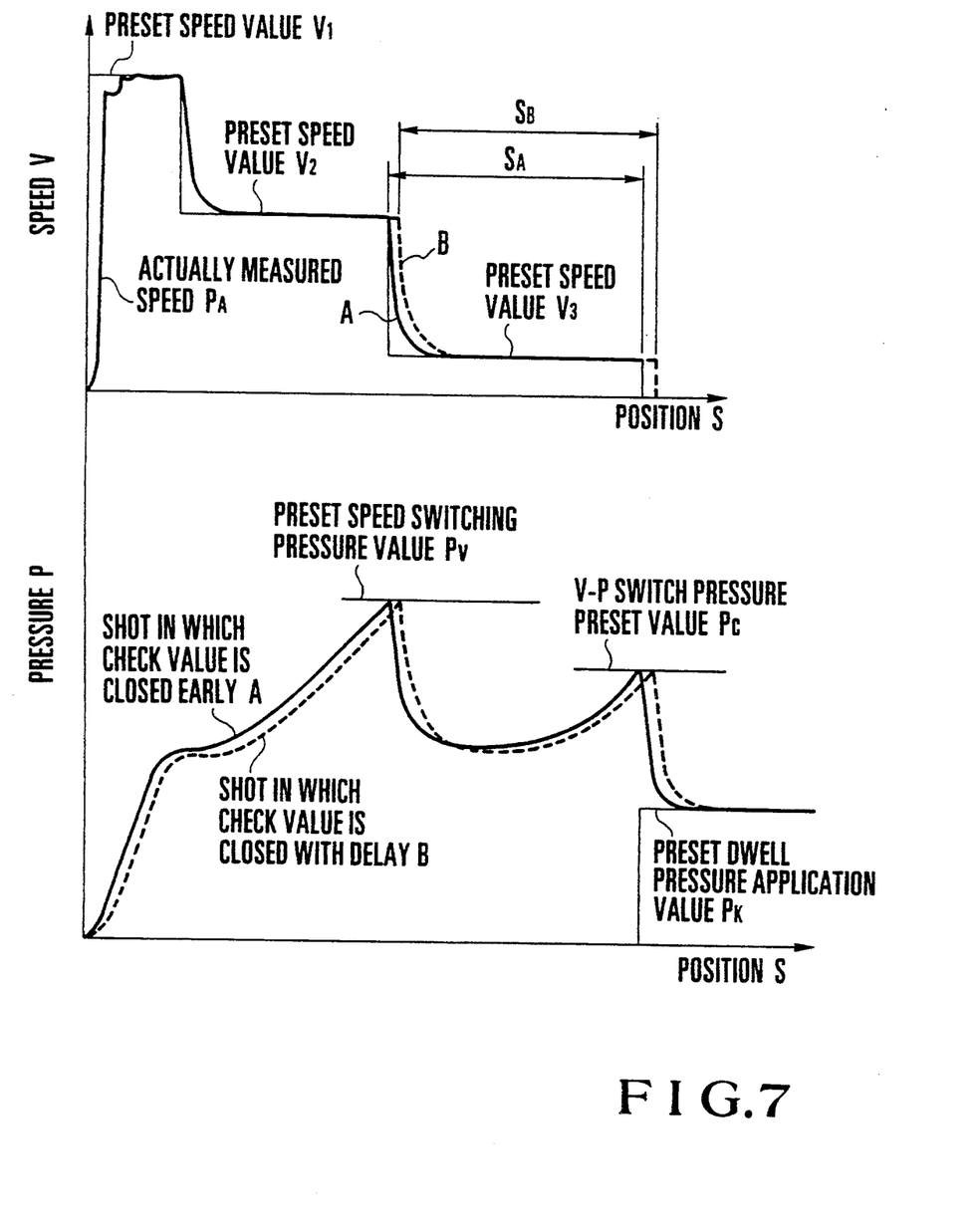
FIG. 7 is a graph of injection process control that indicates still another embodiment of the present invention.

FIG. 7 shows still another embodiment. In this embodiment, of the plurality of stages of injection speeds, the final-stage injection speed is set lower than the injection speed of a stage preceding the final stage. At least at the switching point of the final stage of the change/switching points of the plurality of stages of injection speeds, the injection speed of the injection screw is switched to the preset low injection speed when the injection cylinder pressure measured by the pressure detector, the resin pressure, or the mold pressure reaches the preset value.

More specifically, as shown in FIG. 7, of the plurality of stages of injection speeds (in the embodiment of FIG. 7, the three stages including preset speed values V1, V2, and V3) of the filling step, at least a switching operation from the injection speed V2 to the injection speed V3 of a stage preceding the final stage is performed not as a position switching operation but as a pressure switching operation. When a pressure P measured by the pressure detector 40 reaches a preset speed switching pressure value PV, an injection speed V is switched from the preset speed value V2 to V3. In this case, when the pressure curve of a shot B in which the check valve 8 is closed with a delay, is compared with the pressure curve of a shot A in which the check valve 8 is closed early, the former indicates a pressure lower than that in the shot A at the same position S, as shown in FIG. 7, due to a delay in rise at the initial stage of the filling step. The position of the pressure curve of the shot B where the preset speed switching pressure value Pv is reached at the final-stage injection speed switching point is deviated to the forward side (to the right in FIG. 7) from that of the shot A. The pressure curve of the shot B exhibits the similar behavior also at the V - P switching point, and the deviation value is also almost the same. In fine, it was confirmed from molding experiments and tests employing the actual apparatus that the final-stage injection distance SA of the shot A was almost equal to the final-stage injection distance SB of the shot B.

More specifically, when the check valve 8 is closed with a delay, the V - P switching position moves close to the forward side of the screw, as described above. However, the pressure during filling at a screw position before this is relatively lower than in a shot in which the check valve is closed early. It is thus obvious that the pressure during filling can be utilized as a means for determining the closing degree of the check valve 8 in a given shot before the V - P switching position is reached. Thus, as a control method for minimizing the adverse influence of the variations in closing characteristics of the check valve, injection process control is performed wherein a switching operation is performed to a next-stage injection speed preset value when the pressure during filling reaches a preset value. As a result, the non-uniformities in the final-stage speed area and the time varying from one shot to another, which variations are seen in conventional injection process wherein all the injection speed switching operations are performed as position switching operations, are eliminated as much as possible. Thus, variations in weight of the molded articles and variations in quality of the molded articles which are caused by the variations in weight of the molded articles can be prevented.

Since the preset final-stage speed value V3 is set lower than the preset speed value V1 or V2 of a preceding stage, the precision of the V - P switching point is improved. As the dynamic inertia of the resin at the end point is low in the final-stage injection speed area, formation of flashes is decreased, thus decreasing the fraction defective.

According to the embodiment of FIG. 7, the final-stage injection time is stabilized even in molding of a low-viscosity resin with which the closing characteristics of the check valve tend to vary. Thus, stabilization of the molded products, which cannot be achieved by the conventional control method, can be achieved. Even with this embodiment, a graph similar to FIG. 6 can be obtained, in which the final-stage injection times of the respective shots are connected. When this embodiment is compared with FIG. 11 showing the measurement result of the conventional method, it is obvious that the final-stage injection time is stabilized. Especially, when a resin material, e.g., nylon, whose molten viscosity has a high temperature dependency, is employed, according to the conventional control method, the final-stage injection time varies due to the variations in closing characteristics of the check valve. As a result, even when control is shifted to pressure control at the same V - P switching pressure to start the dwell pressure application step, the entire filling amount of the mold during the V - P switching operation cannot be maintained at a constant value. This is because when the check valve is closed with a delay, the time in which control is performed with the final-stage injection preset speed is prolonged, and the temperature of the molten resin in the mold is decreased, thereby increasing its viscosity. In this embodiment, since both the start and end points of the final-stage injection preset speed are switched in accordance with the preset pressure, the final-stage injection time is not influenced by the closing degree of the check valve, but is constantly maintained at a substantially predetermined time, as has been described above, and the molded articles are stabilized.

Figure 8:
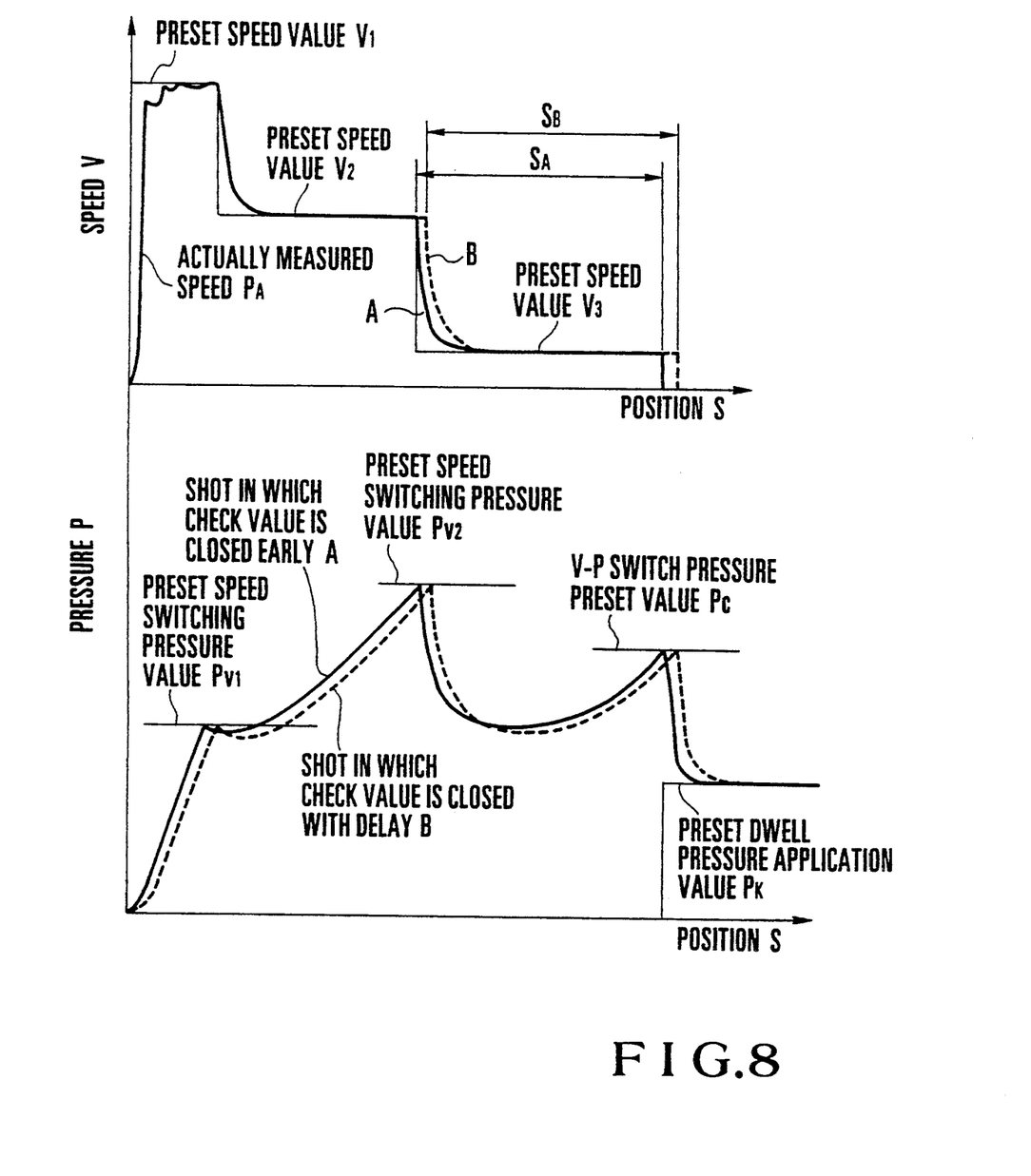
FIG. 8 is a graph of injection process control that indicates still another embodiment of the present invention.

FIG. 8 shows still another embodiment. In this embodiment, all the injection speed switching operations of the injection screw, which are performed at change/switching points of a plurality of stages of injection speeds, are performed when either the injection cylinder pressure measured by the pressure detector, the resin pressure, or the mold pressure reaches the preset value.

More specifically, as shown in FIG. 8, of the plurality of stages of injection speeds (in the embodiment of FIG. 8, the three stages including preset speed values V1, V2, and V3) of the filling step, at least a switching operation from the injection speed V2 to the injection speed V3 of a stage preceding the final stage is performed not as a position switching operation but as a pressure switching operation. When a pressure P measured by the pressure detector 40 reaches a pressure which is preset in accordance with corresponding change/switching point, the switching operations of the respective injection speeds (V1 - V2, V2 - V3) are performed. In this case, as shown in FIG. 8, when the pressure curve of a shot B in which the check valve 8 is closed with a delay, is compared with the pressure curve of a shot A in which the check valve 8 is closed early, the pressure curve of the shot B maintains the delay in the initial stage of the filling up to the respective change/switching points and the V - P switching point. A deviation in the shot A at a position S, where the speed switching pressure preset value PV2 is reached at the final-stage injection speed switching point becomes equal to a deviation in the shot A at a position S, where the V - P switching pressure preset value PC is reached at the V - P switching point and the final-stage injection speed preset area ends. Therefore, the final-stage injection distance SB becomes equal to the final-stage injection distance SA of the shot A. This was confirmed from molding experiments and tests employing an actual apparatus.

More specifically, when the check valve 8 is closed with a delay, the V - P switching position moves close to the screw advance side, as described above. However, the pressure during filling at a screw position prior to this is relatively lower than that in a shot in which the check valve is closed early. It is thus obvious that the pressure during filling can be utilized as a means for determining the closing degree of the check valve 8 in a given shot before the V - P switching position is reached. Thus, as a control method for minimizing the adverse influence of the variations in closing characteristics of the check valve, injection process control is performed wherein switching operation is performed to a next-stage injection speed preset value when the pressure during filling reaches a preset value. As a result, the non-uniformities in the final-stage speed area and the time varying from one shot to another, which variations are seen in conventional injection process wherein all the injection speed switching operations are performed as position switching operations, are eliminated as much as possible. Thus, variations in weight of the molded articles and variations in quality of the molded articles which are caused by the variations in weight of the molded articles can be prevented.

According to the embodiment of FIG. 8, the final-stage injection time is stabilized even in molding of a low-viscosity resin with which the closing characteristics of the check valve tend to vary. Thus, stabilization of the molded products, which cannot be achieved by the conventional control method, can be achieved. Even with this embodiment, a graph similar to FIG. 6 can be obtained, in which the final-stage injection times tx of the respective shots are connected. When this embodiment is compared with FIG. 11 showing the measurement result of the conventional method, it is obvious that the final-stage injection time tx is stabilized.

It should be noted that the preset or detection pressure is not limited to only a pressure, but can be any physical amount. The physical amount is defined as a strain in a mechanical component (e.g. a screw) receiving a compression force generated by an injection pressure or a mechanical component (e.g., a barrel head mounting bolt) receiving a tensile force, or a change (the principle of stress or strain measurement by a strain gauge) in electrical resistance generated by the above strain.

The present invention is not limited to the above embodiments, but various applications, changes, and modifications may be made.

What is claimed is:

1. An injection control method for an injection molding machine which uses a step of filling a molten resin in a mold with an injection screw incorporated in a heating cylinder while changing an injection speed of the injection screw at a plurality of positions, and a dwell pressure application step of applying a pressure into said mold after filling, wherein
   a predetermined filling pressure for determining a closing degree of a check valve is preset, and
   said filling step comprises comparing stroke information concerning an actual position of said injection screw with information concerning a reference position of said injection screw when one of pieces of information concerning a filling pressure, that changes in the filling step, reaches the predetermined filling pressure, and adjusting a subsequently performed change operation based on a difference between two pieces of information.

2. A method according to claim 1, wherein the change operation is a change operation of a filling speed in the filling step.

3. A method according to claim 1, wherein the change operation is an operation of shifting a step from the filling step to the dwell pressure application step.

4. A method according to claim 1, wherein the information concerning the filling pressure is information concerning one of an injection cylinder pressure, a resin pressure, and a pressure in said mold.

5. A method according to claim 2, wherein the predetermined filling pressure is set within a pressure of an initial filling speed in the filling step.

6. A method according to claim 2, wherein the predetermined filling pressure is a pressure which is obtained after a first filling speed switching point in the filling step.

7. A method according to claim 2, wherein the change operation is performed at least at a filling speed switching point of a final stage in the filling step.

8. A method according to claim 2, wherein the filling step has a final-stage injection speed which is lower than an injection speed of a preceding stage.

9. A method according to claim 2, wherein the change operation is performed at all filling speed switching points in the filling step.

10. A method according to claim 1, wherein switching operations of injection speeds before the filling pressure reaches the determination filling pressure are respectively performed at preset reference injection speed switching positions of said injection screw.

11. A method according to claim 1, wherein the injection speed is switched from a first speed to a second speed at a position where the filling pressure reaches the determination filling pressure.

12. A method according to claim 1, wherein a switching operation from the filling step to the dwell pressure application step is performed when the filling pressure reaches a preset switching pressure for dwell pressure application.

13. A method according to claim 1, wherein a final switching point among switching points of the injection speed and a switching point from the filling step to the dwell pressure application step are set at positions where the filling pressure reaches the determination filling pressure.

14. A method according to claim 7, wherein a preset switching pressure of the final switching point of the injection speed is set higher than a preset switching pressure from the filling step to the dwell pressure application step.

15. A method according to claim 1, wherein the preset pressure and a detection pressure use physical amounts resulting from pressures.

* * * * *